Oct. 1, 1963   J. R. WEAVER, JR., ET AL   3,105,697
SHOCK-ABSORBING SKID
Filed Sept. 14, 1962                                       2 Sheets-Sheet 1
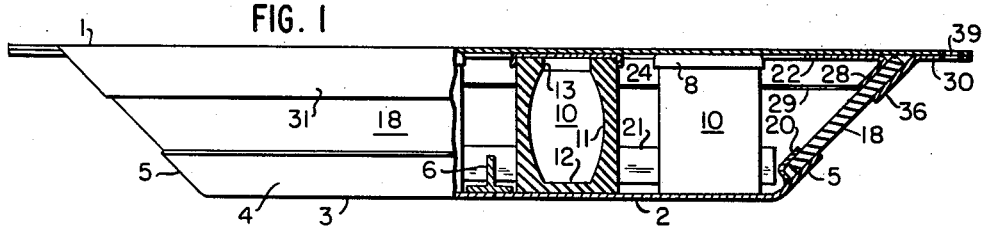
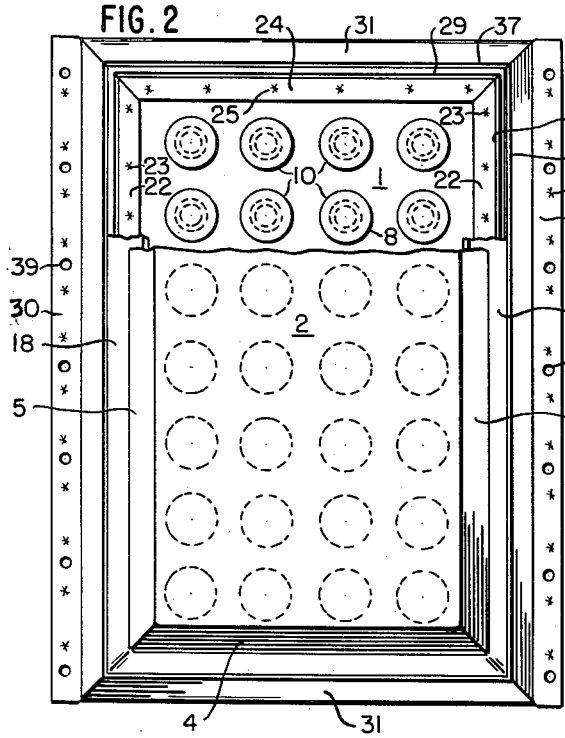
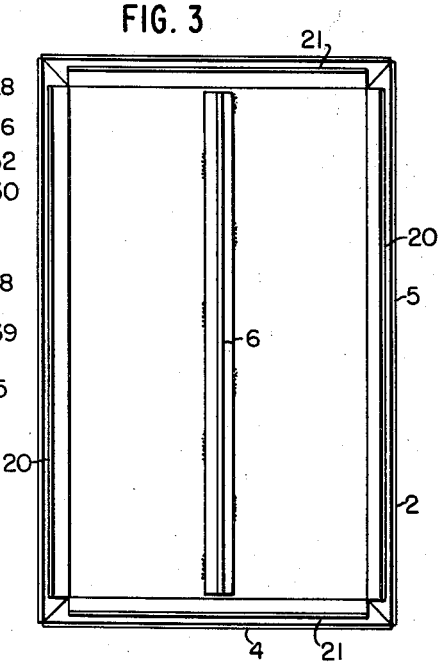
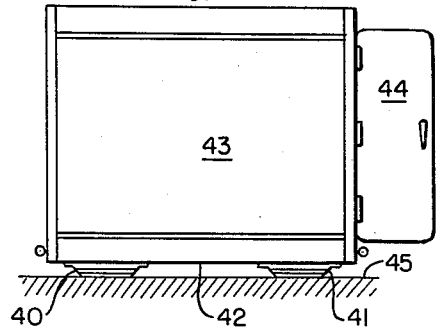
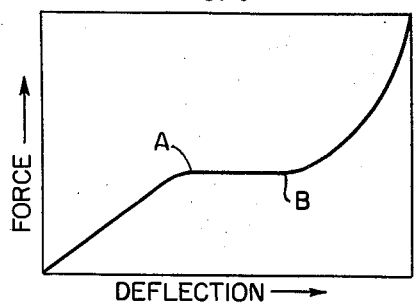
INVENTOR.
John R. Weaver, Jr.
Michel G. Pierrat
BY Kenway, Jenney & Hildreth
ATTORNEYS

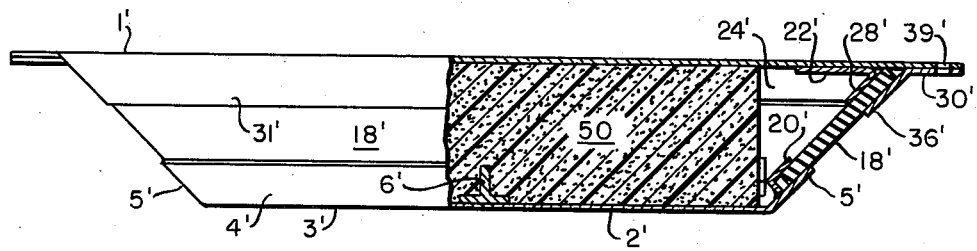
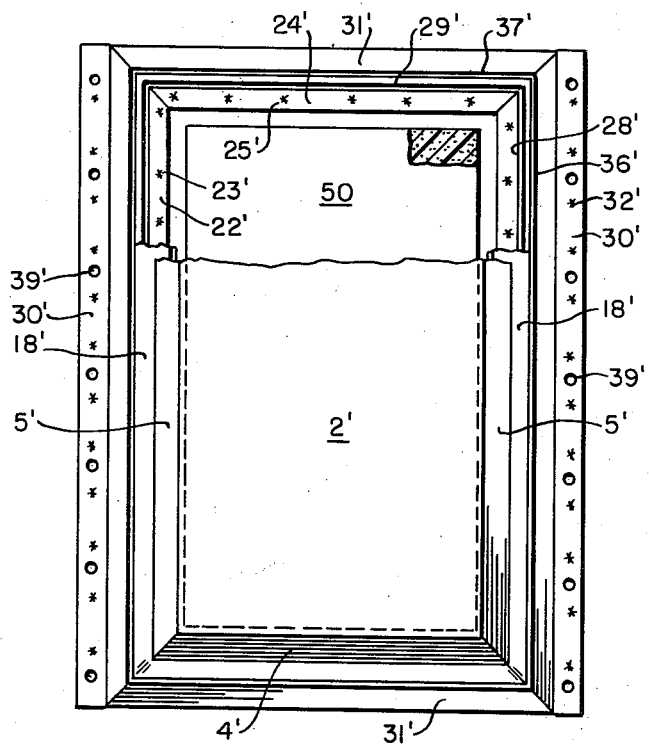

United States Patent Office 3,105,697
Patented Oct. 1, 1963

3,105,697
SHOCK-ABSORBING SKID
John R. Weaver, Jr., Rowley, and Michel A. Pierrat, Andover, Mass., assignors to Craig Systems, Inc., Lawrence, Mass., a corporation of Massachusetts
Filed Sept. 14, 1962, Ser. No. 224,282
6 Claims. (Cl. 280—25)

This invention relates to shock-absorbing skids, and has as its primary object to provide an improved shock-absorbing skid which affords improved attenuation of shock loading and absorption of shear loading transverse to a normal direction of application of shock load thereto. It is a further object of the invention to provide an improved shock-absorbing skid having an omni-directional loading capacity, being capable of absorbing loads applied with any vector between the horizontal and the vertical. It is still another object of the invention to afford a shock-absorbing skid having improved sealing means to prevent the accumulation of dirt and foreign matter therein, which might otherwise interfere with the proper operation of the skid.

Briefly stated, according to one embodiment thereof, we may carry out our invention by providing a shock-absorbing skid including a shoe having a skid surface and a mounting plate spaced from an upper surface of the shoe, by interposing at least one resilient shock element between the shoe and the mounting plate, and by extending and securing a resilient sheet member between the shoe and the plate about their peripheries. The sheet encloses the shock element to prevent the accumulation of dirt and foreign matter between the plate and the shoe, and absorbs shear loadings having components of direction transverse to the compression axis of the shock element, which compression axis is substantially perpendicular to the skid surface. Complementary frame members are fastened in confronting relation about the peripheries of the shoe and the frame for receiving and securing the sheet member, which performs the sealing and shear load-absorbing functions without adversely affecting the shock absorbing action of the resilient shock element.

Annular resilient shock elements are well suited to the absorption and attenuation of shock loads along their major (compression) axes, and it is preferred to incorporate a plurality of such elements in the skid. However, such elements are not well adapted to the absorption of shear loads transverse to their compression axes, such as may arise from horizontal movement of the skid over a rough surface upon which the shoe rests. In our improved skid, however, such shear loads are absorbed by the peripheral sheet member rather than the shock elements. In an alternative form, a single block of resilient material, such as plastic foam, may comprise the resilient element; such a block is also well adapted to absorb loads in compression, and need not be subjected to shear loading in the improved skid.

The skid exhibits excellent omni-directional capacity to absorb shock and shear loadings arising from dropping or bumping of an associated container, as well as from dragging of the container over rough surfaces. Further features and advantages of the improved skid will become apparent from the following detailed description of a preferred embodiment thereof, referring to the accompanying drawings, in which:

FIG. 1 is an end view in elevation of a preferred form of the improved skid, shown partially in section;

FIG. 2 is a bottom plan view of the skid, with parts broken away to more clearly illustrate the interior construction thereof;

FIG. 3 is a top plan view of a shoe forming a portion of the skid;

FIG. 4 is a view showing a plurality of the skids in an illustrative application thereof to a portable equipment container;

FIG. 5 is a diagram illustrating the force-deflection characteristic of the skid under shock loading;

FIG. 6 is an end view in elevation of an alternative form, shown partially in section; and FIG. 7 is a fragmentary bottom plan view of the skid of FIG. 6.

Referring to FIGS. 1–4, a preferred embodiment of the improved shock-absorbing skid includes an upper mounting plate 1 extending in parallel spaced-apart relation to a generally planar lower skid surface portion 3 of a shoe 2. The shoe is formed with upwardly inclined lateral edge surfaces 4 and longitudinal edge surfaces 5, to cause the skid to slide over small obstructions, regardless of the direction of movement of the skid. A T-section reinforcing beam 6 is secured in longitudinally-extending relation upon the upper surface of the shoe, as by a series of spaced spot welds, for stiffening the structure.

A plurality of annular shock elements 10, of a resilient material such as rubber, are interposed between the shoe and the plate, each being received in a locating cup 8 welded or otherwise secured to the plate. The shock elements are externally cylindrical bodies of revolution, whose major (compression) axes extend perpendicularly to the major surfaces of the shoe and mounting plate. The internal surfaces 11 may also be cylindrical, but in the preferred embodiment shown, they are so formed that a longitudinal half-section of each element is internally concave. The elements are closed at a first end 12, but for convenience in their formation they are open at a second end 13. Groups of the elements are arranged in spaced parallel rows to afford collectively a uniform shock-absorbing action over the entire surface of the skid. It will be apparent that the number and size of the elements may be selected according to the anticipated shock loading of the skid in a particular application, to provide optimum shock absorption and damping characteristics.

Partially for the purpose of preventing the accumulation of dirt or other foreign matter between the shoe and the plate, which accumulation might interfere with the action of the shock elements, we provide a sheet member 18 of rubber, plastic or other flexible material which is impervious to moisture and resistant to abrasion. We prefer to form the sheet member as a continuous peripheral strip for maximum sealing effectiveness, although it may alternatively be made up of four sections overlapping and cemented at the corners of the skid. The sheet member should be sufficiently flexible in a direction transverse to the shoes so as not to interfere with the shock-absorbing action of the elements 10, and in itself affords little resistance to deflection in that direction.

For supporting the sheet member 18 peripherally about the shoe and the mounting plate in position to enclose the shock elements, we provide complementary frame members mounted upon the shoe and the plate, for receiving the upper and lower edges of the sheet member. A pair of frame members 20 extends longitudinally along the inclined edges 5 of the shoe, and a pair of frame members 21 similarly extends along the lateral edges 4, the frame members being welded upon the interior surface of the shoe to form a groove in cooperation with the edges of the shoe which is peripherally substantially continuous. Upon the lower surface of the mounting plate 1, a pair of frame members 22 is spot welded at a series of points 23 in longitudinally-extending relation, and a pair of frame members 24 is spot welded at a series of points 25 in laterally-extending relation. The frame members 22 and 24 are formed with bent-up flanges 28 and 29, respectively, at acute angles thereto, to form supporting surfaces extending toward the periphery of the shoe. A pair of frame members 30 is spot welded at a series of points 32 in longitudinally-extending relation upon the lower surface of the mounting plate, in spaced relation to the frame members 22, and is formed with bent-up flange portions 36 extending generally parallel to the flange portions 28 to form a groove therebetween for receiving the sheet member. Similarly, a pair of frame members 31 is welded in laterally-extending relation upon the edges of the mounting plate, in spaced relation to the frame member 24 and is formed with bent-up flange portions 37, to complete a peripheral groove for receiving the sheet member. The sheet member is firmly secured in the peripheral grooves of the mounting plate and the shoe by a suitable cement, such as an epoxy resin. A series of openings 39 are formed in longitudinal array along the longitudinal edges of the mounting plate and the frame members 30, for convenient mounting of the skid upon the lower surface of a desired container.

Referring to FIG. 4, an illustrative application of the improved skid is shown, in which two pairs of skids 40 and 41 are mounted at the four corners of a lower surface 42 of a portable equipment container 43 having an access door 44. The skids serve to isolate the container 43 from shock loadings arising from movement of the container upon a surface 45, or from dropping of the container thereon. The improved construction enables the skids to absorb transverse shear induced by movement of the container horizontally upon the surface. While the rubber shock elements are especially designed to attenuate shock loadings applied vertically upon the shoe, they are not adapted to absorb shear loads transverse to their major axes, and therefore are not secured to the shoe and the mounting plate. The sheet member 18, however, is admirably suited for the absorption of shear loads transverse to the shock elements, since it is inclined to the vertical and secured to the shoe and the mounting plate for loading in tension.

For the absorption of the vertical components of shock loads, the shock elements 10 operate in a well-known manner to attenuate the shock by reducing the rate of its application to the supported container. As illustrated in the diagram of FIG. 5, the initial compression of the elements by a shock load is characterized by a linear relationship of deflection to applied force, whose slope corresponds to the modulus of elasticity of their material in compression. The continued application of force beyond point A eventually produces a rapid deflection, the walls of the elements buckling outwardly very rapidly without any substantial increase in the applied loading; as a result, the rate of acceleration of the supported container is greatly reduced. When the elements have substantially fully buckled, at point B, they resume a deflection-force relationship which corresponds to their modulus of elasticity in compression. The applied force is thus transmitted in a delayed manner to the container. This principle of operation of the shock elements is in itself well known, and forms no part of the present invention. However, the combination of these shock elements for the absorption of the vertical components of shock loads, with the sheet element 18 for absorbing shear loads transverse to the major axes of the shock elements, provides an improved skid which is effective for the omni-directional absorption of shock loadings resulting not only from dropping of the supported container, but also from its horizontal movement over rough surfaces. The sheet member peripherally disposed about the skid also serves to prevent dirt and moisture from accumulating within the skid to interfere with its proper operation.

An alternative embodiment of the improved skid is shown in FIGS. 6 and 7, in which parts similar to those of the previously-described embodiment are similarly numbered, with prime superscripts. The modification comprises the substitution of a block 50 of resilient compressible material, such as plastic foam, rubber, or the like, as a shock element, in place of the plurality of annular shock elements 10 in the preceding embodiment. The block 50 is interposed between the shoe 2 and the mounting plate 1, but is unsecured so that it need not absorb shear forces applied to the skid transversely of a compression axis perpendicular to the skid surface 3'. As in the preceding embodiment, such shear forces are sustained primarily by the sheet member 18'.

Various changes and modifications will readily occur to those skilled in the art without departing from the true spirit and scope of our invention. We therefore intend in the appended claims to cover all such changes and modifications.

The present application is a continuation-in-part of our co-pending application Serial No. 90,313, filed February 20, 1961, now abandoned, and entitled "Shock-Absorbing Skid."

What we claim and desire to secure by Letters Patent of the United States is:

1. A shock-absorbing skid comprising, in combination; a shoe having a lower skid surface portion, a mounting plate extending in spaced relation to an upper surface of said shoe, at least one resilient shock element extending between said shoe and said plate for compression of said shock element along an axis substantially perpendicular to said skid surface, and a flexible sheet member extending between and secured to said shoe and said plate, said sheet member being inclined to said skid surface, sections of said sheet member taken on planes perpendicular to said skid surface extending rectilinearly between said shoe and said plate in an unloaded condition of said skid for absorption of shear forces upon their initial application to said skid transversely of said perpendicular axis.

2. A shock-absorbing skid comprising, in combination; a shoe having a lower skid surface portion, a mounting plate extending in spaced relation to an upper surface of said shoe, a plurality of resilient shock elements extending between said shoe and said plate with the major axes of said shock elements substantially perpendicular to said skid surface, and a flexible sheet member extending between and secured to said shoe and said plate, said sheet member being inclined to said skid surface, sections of said sheet member taken on planes perpendicular to said skid surface extending rectilinearly between said shoe and said plate in an unloaded condition of said skid for absorption of shear forces upon their initial application to said skid transversely of the major axes of said elements.

3. A shock-absorbing skid comprising, in combination; a shoe having a lower skid surface portion, a mounting plate extending in spaced relation to an upper surface of said shoe, at least one resilient shock element extending between said shoe and said plate for compression of said shock element along an axis substantially perpendicular to said skid surface, and a flexible sheet member extending peripherally about said shoe and said plate and secured thereto to enclose said shock element therebetween, opposed sections of said sheet member taken on planes perpendicular to said skid surface being inclined at opposite angles to said skid surface and extending rectilinearly between said shoe and said plate in an unloaded condition of said skid for absorption of shear forces upon their initial application to said skid transversely of said perpendicular axis.

4. A shock-absorbing skid as recited in claim 3, in which said sheet member forms a frustum of a pyramid in an unloaded condition of said skid.

5. A shock-absorbing skid comprising, in combination; a shoe having a lower skid surface portion, a mounting plate extending in spaced relation to an upper surface of said shoe, at least one resilient shock element extending between said shoe and said plate for compression of said shock element along an axis substantially perpendicular to said skid surface, two complementary frame members secured in spaced-apart confronting relationship upon said shoe and said plate, respectively, and a flexible sheet member extending between said shoe and said plate and secured in said frame members, elements of said sheet member being inclined to said skid surface and extending rectilinearly between said shoe and said plate in an unloaded condition of said skid for absorption of shear forces upon their initial application to said skid transversely of said perpendicular axis.

6. A shock-absorbing skid as recited in claim 5, in which said frame members and said sheet member extend peripherally about said shoe and said plate to enclose said shock element therebetween, opposed sections of said sheet member taken on planes perpendicular to said skid surface being inclined at opposite angles to said skid surface.

References Cited in the file of this patent

UNITED STATES PATENTS

| | | |
|---|---|---|
| 342,215 | McCormick | May 18, 1886 |
| 1,812,861 | Chase | July 7, 1931 |
| 2,197,701 | Mestas | Apr. 16, 1940 |
| 2,727,738 | Lindley | Dec. 20, 1955 |
| 2,904,302 | Cavanaugh et al. | Sept. 15, 1959 |
| 2,929,592 | Spaetgens | May 22, 1960 |

FOREIGN PATENTS

| | | |
|---|---|---|
| 540,084 | Great Britain | Oct. 6, 1941 |
| 213,983 | Switzerland | June 16, 1941 |